C. POWLISON.
BEET HARVESTER.
APPLICATION FILED SEPT. 7, 1912.
1,075,939.
Patented Oct. 14, 1913.
2 SHEETS—SHEET 1.
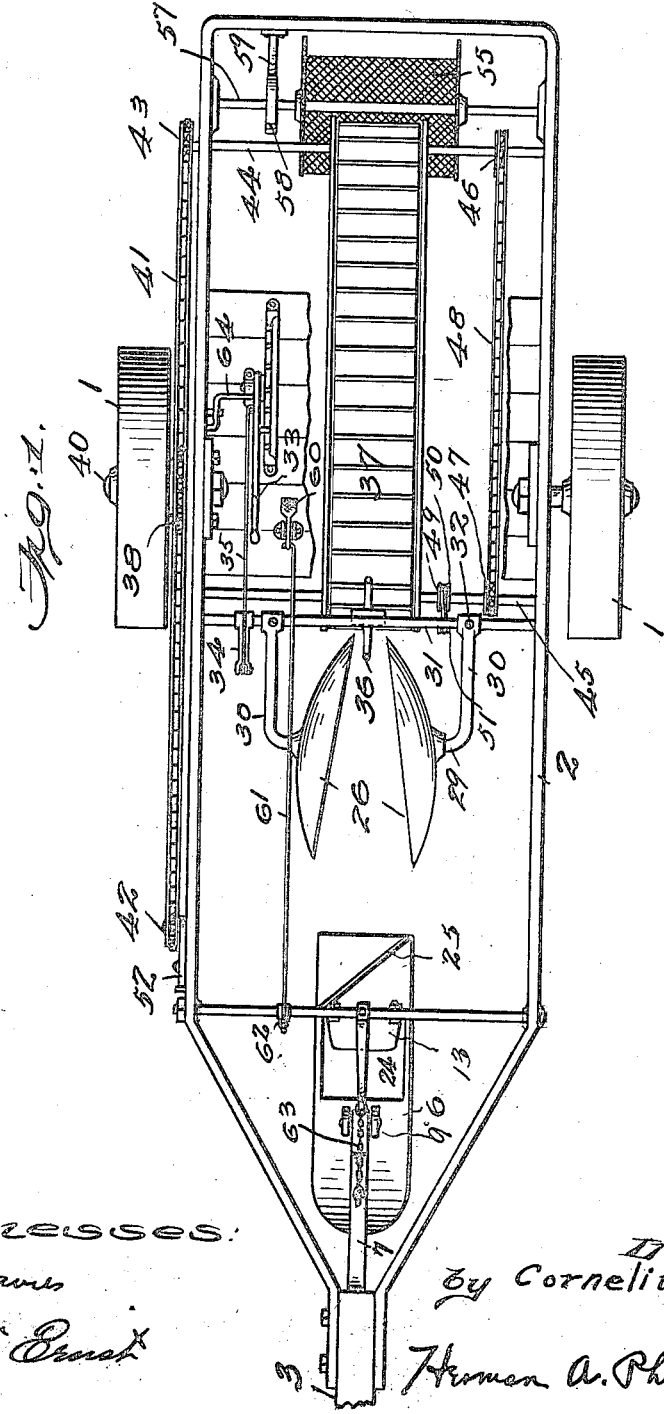
Witnesses:
C. K. Davis
F. Wm. Ernst
Inventor
Cornelius Powlison
by Herman A. Phillips
Atty C. POWLISON.
BEET HARVESTER.
APPLICATION FILED SEPT. 7, 1912.
1,075,939.
Patented Oct. 14, 1913.
2 SHEETS—SHEET 2.
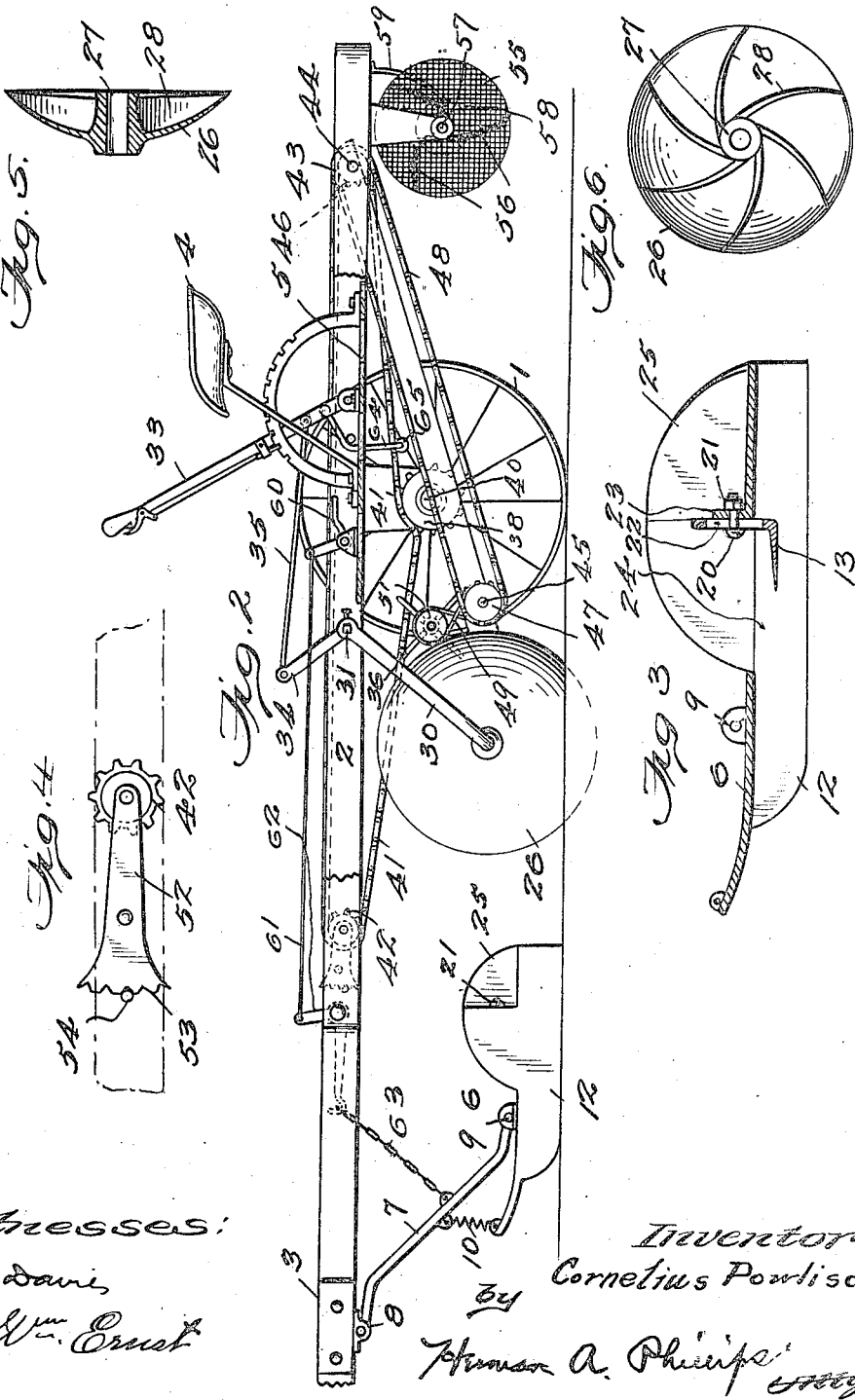
Witnesses:
C. K. Davis
F. Wm. Ernst
Inventor
Cornelius Powlison
by Hiram A. Phillips, atty.

UNITED STATES PATENT OFFICE.

CORNELIUS POWLISON, OF DURAND, MICHIGAN.

BEET-HARVESTER.

1,075,939. Specification of Letters Patent. Patented Oct. 14, 1913.

Application filed September 7, 1912. Serial No. 719,110.

*To all whom it may concern:*

Be it known that I, CORNELIUS POWLISON, a citizen of the United States, residing at Durand, in the county of Shiawassee and State of Michigan, have invented certain new and useful Improvements in Beet-Harvesters, of which the following is a specification.

My present invention relates to improvements in beet harvesters, and is designed to provide an implement for this purpose which is adapted to "top" the beet while in the ground, to dig or raise the beets from the ground, and by means of a conveyer, transfer the beets to a basket, from which the beets are emptied at regular intervals.

The invention consists essentially in certain novel features of construction and combinations and arrangements of parts as hereinafter set forth and claimed.

In the accompanying drawings I have illustrated one example of the physical embodiment of my invention constructed according to the best mode I have so far devised for the practical application of the principles of the invention.

Figure 1 is a plan view of the implement embodying my invention. Fig. 2 is a side view of Fig. 1 with parts broken away for convenience of illustration. Fig. 3 is an enlarged detail sectional view of the beet topping knife and connections. Fig. 4 is a detail of a drive-chain connection. Fig. 5 is a vertical sectional view of the lifting disk or beet digger. Fig. 6 shows the working face of one of the disks.

In the preferred embodiment of my invention the implement is supported upon the traction wheels 1 through the frame 2, and is adapted to be drawn by horse power attached to the tongue 3 of the implement.

The operator or driver occupies the seat 4 which is supported upon the platform 5 connecting the side bars of the main frame 2.

Located at the forward part of the implement is a member having the appearance of a sled, as indicated at 6. This sled is supported by bar 7 which is pivotally connected to the tongue at 8 and to the sled at 9. A spring 10 is attached at the front of the sled or runner and is also attached to the brace bar 7 to provide against displacement of the parts. This sled is adapted to slide over the ground as the implement is drawn along and the sled is held elevated by its side runners or flanges 12. A knife or cutter 13 is supported under the sled by a bolt 20 and nut 21, the former being adjustable in the slot 22 of lugs 22' of the knife, and supported in uprights or lugs 23 which rise from the floor of the sled or runner. The edge of the knife extends horizontally forward under the opening 24 which is provided in the floor of the sled and this opening permits the tops, after being cut from the growing beet, to pass upwardly therethrough. The top is then guided to one side by the shield 25 which throws the top out of the path of the approaching disks 26.

The pair of disks 26 are adapted to lift the beet from the ground after the topping knife has cut therefrom the top. As indicated in Figs. 5 and 6 particularly the disks are dished or cup shaped and formed with a central hub 27 from which extend a series of tangential, curved ribs 28. The ribs on the disks are arranged in pairs, so that the disks comprise a "right" and a "left" in making up a pair.

The position and location of the disks are very well illustrated in Figs. 1 and 2 and it will be observed that the disks are arranged to diverge forwardly, *i. e.* they are nearer together at the rear than at the front, and project into the ground a suitable distance. As the implement is drawn along the disks are rotated upon their axles 29, each axle being the bent end of a bracket 30. The brackets are attached in an adjustable manner to the rock bar 31 by means of the set screws 32, and the rock bar may be rocked to raise the disks from the ground by means of the lever 33, link 34 and rod 35.

When the disks are in lowered position as in Fig. 2, the travel of the implement rotates the disks and the beets are clamped and held between the opposite ribs of the disks. The continued rotation of the disks lifts the clamped beets upwardly into position where they will be in the path of a rotating spider 36. This spider 36 rotates in a direction opposite to that of the travel of the disks, and the result is that the beets are transferred from between the ribs of the disks to the endless conveyer 37. It will be understood that not alone the clean beet is lifted from the ground by the disks, but a coating of dirt is clinging to each beet, and the beet, while it is held with sufficient security to prevent dropping from between the disks, may yet be easily freed by the spider as its forks come in contact with the beets.

The spider and conveyer are actuated from the traction wheels by means of the sprocket 38 on the stub shaft 40, and sprocket chain 41 which passes over forward idle wheel 42 and the rear sprocket 43 which latter is supported to rotate with the shaft 44 journaled in the frame 2. The second shaft 45 of the conveyer is also rotated from the shaft 44 by means of sprockets 46 and 47 and chain 48, and the spider is rotated in a reverse direction by means of the crossed sprocket chain 49 which passes over the sprocket wheels 50, 51.

The forward end of the chain 41 is supported through the idle sprocket wheel 42 by an adjustable, pivoted bracket 52, which is corrugated at 53 and is adapted to engage a bolt or pin 54 in the frame to hold the bracket in pivoted or adjusted position. By this means the chain 41 may be adjusted with relation to its driving sprocket 38.

By means of the endless conveyer 37 the beets are carried upwardly toward the rear of the implement and are deposited in one of the compartments (three being illustrated) in the screen basket 55 located at the rear of and under the frame 2. This basket has its ends, which are circular, and its bottoms or partitions 56 of wire mesh or screens, and the basket is supported upon the bar or rod 57 extending across the frame of the implement. The bar or rod is rotatable and has rigidly fixed thereon a rack wheel 58 provided with three teeth in which the spring pawl or detent 59 is adapted to engage. Thus when the basket is empty, the basket is held from turning by the engagement of the detent with the rack wheel. As the beets are deposited in the compartment of the basket presenting itself, the load gradually increases, until sufficient to cause the disengagement of the detent and rack wheel, whereupon the basket is turned over and the beets deposited in a pile on the ground. The detent catches the rack wheel after the basket is emptied and holds the basket in position for another load, when the operation is repeated, thus a series of piles of beets is deposited on the ground as the harvester travels.

The sled and cutting knife may be lifted from the ground by means of the foot lever 60, rod 61, lever 62 and chain 63. The drive chain may be disengaged from the drive sprocket by means of the arm 64 pivoted to the lever 33, and the roller 65, as will be understood.

Having thus fully described my invention what I claim as new and desire to secure by Letters Patent is:—

1. In a beet harvester, the combination of a sled having an opening in its floor, and side flanges to elevate it from the ground, perforated webs above the floor at the rear of the opening, a knife adjustably secured in said webs, and an obliquely extending shield located in proximity to said opening.

2. In a beet harvester the combination with a frame, of a sled having an opening in its floor, a bar pivoted to the sled and to said frame, a spring attached at an intermediate point on the bar and at the end of the sled, a knife adjustably secured at the rear of said opening, and an obliquely extending shield located at the rear of the knife.

In testimony whereof I affix my signature in presence of two witnesses.

CORNELIUS POWLISON.

Witnesses:
 ALFRED DENHAM,
 SETH B. TERRY.